United States Patent
Ritter

[15] 3,659,370
[45] May 2, 1972

| [54] | TROLLING DEVICE AND SYSTEM |
| --- | --- |
| [72] | Inventor: Charles P. Ritter, 704 E. Prairie Ronde, Dowagiac, Mich. 49047 |
| [22] | Filed: Sept. 10, 1969 |
| [21] | Appl. No.: 856,554 |
| [52] | U.S. Cl..............................43/43.12, 24/115 F, 24/260 |
| [51] | Int. Cl....................................A01k 91/00, A01k 95/00 |
| [58] | Field of Search................43/43.12; 24/115 F, 201 TR, 24/230 F, 260 |

[56] References Cited

UNITED STATES PATENTS

| 1,194,509 | 8/1916 | Kosovsky..................................24/260 |
| 2,749,649 | 6/1956 | Fitzsimmons..........................43/43.12 |
| 2,786,296 | 3/1957 | Loebensteen..........................43/43.12 |
| 3,023,523 | 3/1962 | Gorenty..............................43/43.12 X |

Primary Examiner—Samuel Koren
Assistant Examiner—Daniel J. Leach
Attorney—Hobbs and Green and Kemon, Palmer & Estabrook

[57] ABSTRACT

A trolling system in which a weight suspended by a line is used to hold a fishing line at the desired depth in the water. A control device releasably connects the fishing line to the weight line and includes a pair of jaws and means for varying the spacing of the jaws to vary the force required to disengage the line from the jaws when a fish is caught. The fishing line, upon being released from the control device, gives the fisherman full control over reeling in and landing the fish.

5 Claims, 5 Drawing Figures

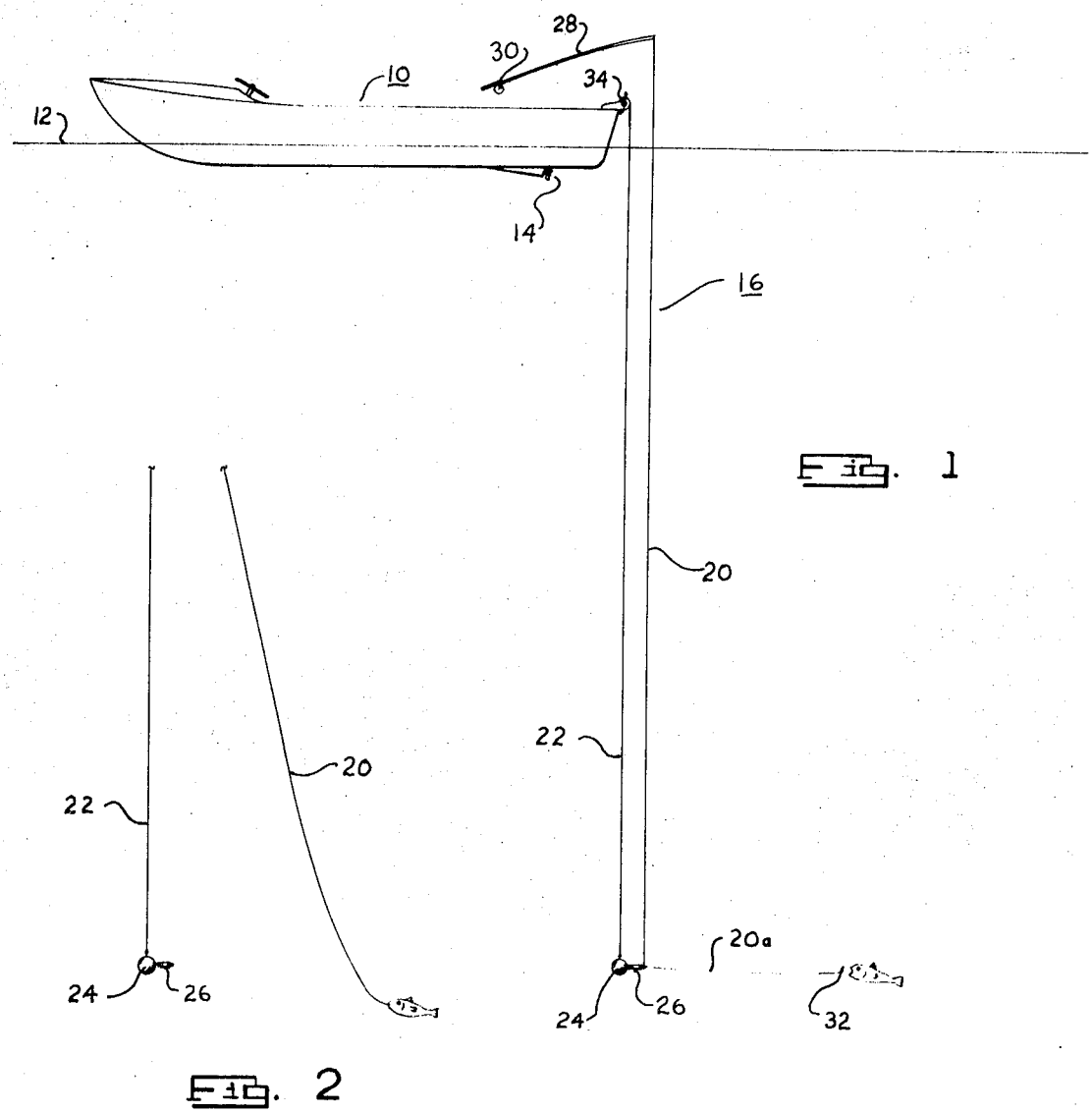

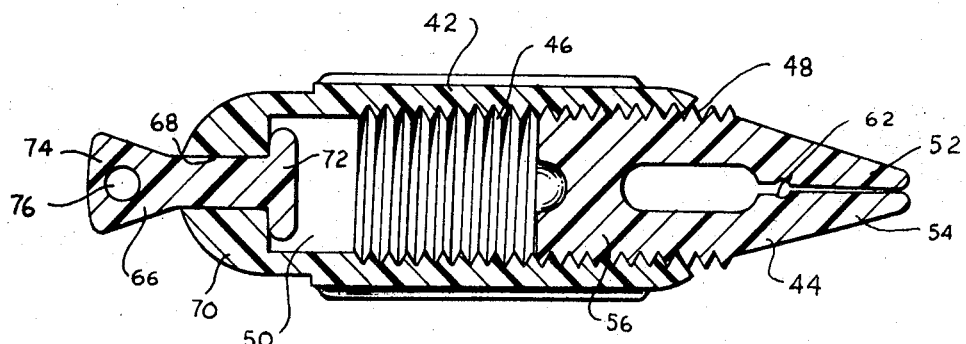
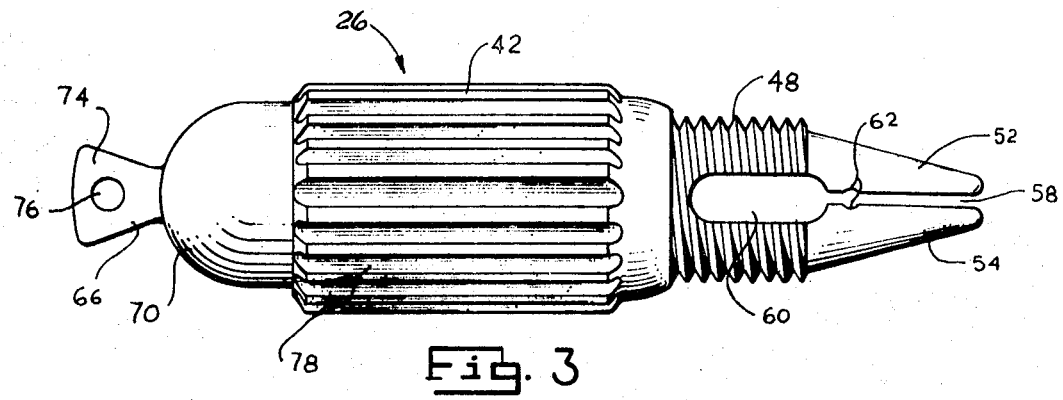
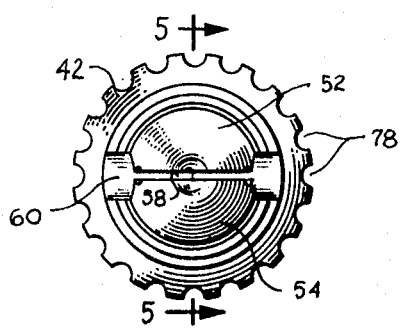

3,659,370

TROLLING DEVICE AND SYSTEM

In trolling, as the conventional fishing line is pulled behind a boat, the natural tendency of the line and lure is to rise in the water as the boat moves forwardly, and this tendency increases as the speed of the boat increases. Since the fish are often near the bottom of a lake or river on which the trolling is being performed, it is desirable to prevent the line and lure from rising as they are pulled by the boat. Weights on the line have been tried in the past but these usually prevent easy maneuvering of the line after a fish has been hooked. A releasable means to permit the fishing line to become detached from the weight when the fish has been hooked has been tried, but the device and system have not been entirely satisfactory, since the weight and line release have prevented immediate control of the line by the fisherman as soon as the fish has struck and, because of varying conditions encountered in different fishing areas, the release device has not been reliable, either in holding the line in connected relation with the weight, or in releasing the line after the fish has been hooked. It is, therefore, one of the principal objects of the invention to provide a system for trolling in which the line is held at the desired depth without any appreciable tendency to rise as the boat moves forwardly, and which will effectively hold the line during the trolling operation until a fish has struck and will thereupon immediately release the line to give the fisherman effective control over the line while the fish is being reeled in and landed.

Another object of the invention is to provide a device for use in trolling which is adapted to be connected to a weight for holding the line and lure at the desired depth in the water and which is readily adjustable to permit the fisherman to vary the force required to disconnect the line from the device and weight so that the trolling system can be adapted to various fishing and lake or river conditions.

Still another object of the invention is to provide a trolling device for use in conjunction with a weight, which is adapted to clamp the fishing line, or an attachment to the line, with a variable degree of pressure, and which can easily be manipulated to connect the line thereto and to adjust the pressure on the line to the desired degree for any particular fishing condition.

A further object is to provide a system and device of the aforesaid type which is simple and durable in construction and dependable in operation, and which is so constructed and designed that the fisherman will have immediate control under any normal fishing condition as soon as the fish strikes and/or is hooked.

Additional objects and advantages of the present invention will become apparent from the following description and accompanying drawings, wherein:

FIG. 1 is a schematic view of a boat, fishing line and lure, illustrating the present system;

FIG. 2 is a fragmentary view of the present system shown in FIG. 1, illustrating the manner in which the system and device operate;

FIG. 3 is a side elevational view of the present fishing line trolling device;

FIG. 4 is an end elevational view of the device shown in FIG. 3; and

FIG. 5 is a longitudinal cross-sectional view of the device, the section being taken on line 5—5 of FIG. 4.

Referring more specifically to the drawings and to FIG. 1 in particular, numeral 10 designates generally a boat and 12 indicates the upper surface of the water of a river or lake. The boat is propelled by propeller 14 driven by an inboard motor (not shown). The present system is mounted on and operated from the boat in the manner illustrated in FIGS. 1 and 2. The system may be operated in any manner consistent with normal trolling practices; however, it is designed to retain the lower end of the line and lure near the bottom or at some other desired depth without any substantial tendency for the lure and the end of the line to rise as the boat moves forward during the trolling operation.

The trolling system 16 consists generally of a fishing line 20, a separate line 22, a weight 24 suspended on line 22, and the present line-control device 26 connected to the weight. The fishing line is normally handled by a pole and reel 28 and 30 by the fisherman sitting in the boat. A lure or bait 32 is attached to the free end of the line and is held at the desired depth by weight 24 and control device 26. Since the weight is relatively heavy and the line 22 may be rather long, a reel 34 of any suitable construction is preferably used to lower and raise the weight. The reel, which is preferably attached to the rear deck of the boat, may be of a type that has a retainer for the weight when the weight is not in use. Weight 24 of the system shown holds line 22 in a substantially vertical position while the boat is moving at trolling speed, and since fishing line 20 is connected to weight 24 by control device 26, line 20 likewise remains in a substantially vertical position until a fish has struck the lure or other bait 32. After the fish has been hooked by the lure or bait, line 20 is released from control device 26, thus permitting the fisherman to have full control over line 20 directly to the fish, thereby permitting him to reel in and land the fish in the normal manner. FIG. 2 illustrates the beginning of the reeling-in operation after the line has been released from control device 26.

The control device 26, illustrated in FIGS. 3, 4, and 5, consists principally of a hollow body 42 and jaw portion or insert 44. The internal walls of body 42 contain screw threads 46 and the external surface of the inner part of jaw portion 44 contains threads 48 which intermesh with threads 46 and permit the jaw portion to be threaded inwardly and outwardly with respect to the hollow interior 50 of body 42. The jaw portion has tapered jaws 52 and 54 formed integrally with the part 56 on which threads 48 are formed. The jaws are separated by a slot 58 which terminates in an enlarged slot portion 60, and jaw portion 44 is flexible and slightly tapered outwardly; i.e., decreasing in diameter from the inner portion towards the two jaws. The jaws are compressed inwardly as the jaw portion is threaded inwardly into cavity 50, thus tending to close slot 58, as illustrated by FIGS. 3 and 5, in which the jaw portion is shown in two different positions. The body 42 and jaw portion 44 are preferably constructed of a firm but somewhat resilient material so that the two jaws can be flexed together and apart as the jaw portion 44 is threaded inwardly and outwardly with respect to cavity 50. Line-retaining recessed 62 may be included in the two jaws in order to hold the fishing line firmly under certain conditions.

The body is connected to weight 24 by a swivel eye member 66 extending through opening 68 in end 70 of body 42 and having an enlarged inner end 72 for retaining the member in the hole. The outer end 74 is of an enlarged configuration and contains a hole 76 for receiving a link, wire or cord for attaching the control device to weight 24. Body 42 is free to rotate relative to swivel member 66 when the line is being held by the two jaws, permitting the control device to assume the most natural position with respect to section 20a of the fishing line, thus minimizing the tendency of the line to become unintentionally caught on the control device. The external surface of the body is preferably provided with fluting 78 to form an effective hand grip for the fisherman while the jaw portion 44 is being rotated to adjust the size of slot 58 when the line is being assembled therein. The control device shown in the drawings may be of any suitable size.

The manner in which the system is operated is effectively illustrated in FIGS. 1 and 2, the control device shown in FIGS. 3, 4 and 5 being manipulated by placing the section 20a of fishing line 20 in slot 58 and rotating body 42 to screw the jaw portion inwardly into cavity 50. The movement of the jaw portion into cavity 50 causes the two jaws 52 and 54 to clamp the fishing line in slot 58. The line normally would be clamped in the slot in a position forward with respect to recess 62 of the jaws. It is important to adjust the pressure on the line in such a manner that the line will readily be released when a fish is hooked, yet will clamp the line sufficiently firmly that it will not be dislodged by the motion in the water, or minor debris or the like in the water, as the boat moves forwardly, pulling the line and bait. When a fish strikes the bait or lure, the force applied to line section 20a causes it to become dislodged from slot 58, thereby permitting the line to swing into the position illustrated in FIG. 2. The reel is normally used to raise and lower the weight and line-control device when the line is reassembled in the slot after a fish has been removed from the hook.

While only one embodiment of the present trolling device and system have been described in detail herein, various changes and modifications may be made without departing from the scope of the invention.

I claim:

1. In a trolling system, a weight, a line for supporting said weight, a fishing line, a fishing line control device comprising a hollow cylindrical body having internal threads and an insert having threads on the external surface for engaging said first threads and including a pair of jaws for releasably holding the fishing line, said jaws being operated by threading the insert into the body to vary the degree of opening of the jaws and thereby vary the degree of force required to remove the line from the jaws and having opposed elongated rearwardly extending line gripping surfaces of substantially straight configuration to permit the line to slide along said elongated surfaces from the jaws, and a means for connecting said line control device to said weight.

2. A trolling system as defined in claim 1 in which said insert is formed of plastic material of a one piece structure.

3. A trolling system as defined in claim 1 in which said insert is formed of plastic material and the portion of the insert containing the threads forms a one piece structure.

4. A trolling system as defined in claim 1 in which a reel is provided for lifting and lowering said weight.

5. A trolling system as defined in claim 3 in which a reel is provided for lifting and lowering said weight.

* * * * *